(12) United States Patent
Baque

(10) Patent No.: US 9,139,165 B2
(45) Date of Patent: Sep. 22, 2015

(54) DEVICE FOR ATTACHING A WINDSHIELD WIPER BLADE ON AN ARM

(75) Inventor: Sylvie Baque, Chateaguay (FR)

(73) Assignee: Valeo Systemes d'Essuyage, La Verriere (FR)

( * ) Notice: Subject to any disclaimer, the term of this patent is extended or adjusted under 35 U.S.C. 154(b) by 1325 days.

(21) Appl. No.: 12/303,489

(22) PCT Filed: Jun. 11, 2007

(86) PCT No.: PCT/EP2007/055690
§ 371 (c)(1),
(2), (4) Date: Nov. 5, 2009

(87) PCT Pub. No.: WO2007/144318
PCT Pub. Date: Dec. 21, 2007

(65) Prior Publication Data
US 2010/0154159 A1    Jun. 24, 2010

(30) Foreign Application Priority Data
Jun. 14, 2006    (FR) ...................................... 06 05327

(51) Int. Cl.
*B60S 1/40* (2006.01)
*B60S 1/38* (2006.01)

(52) U.S. Cl.
CPC ............. *B60S 1/4016* (2013.01); *B60S 1/3848* (2013.01); *B60S 1/3849* (2013.01); *B60S 2001/4012* (2013.01)

(58) Field of Classification Search
CPC .... B60S 1/3849; B60S 1/4006; B60S 1/4009; B60S 1/4016; B60S 1/4019; B60S 2001/4012; B60S 2001/4022

USPC ............ 15/250.32, 250.43, 250.44, 250.361, 15/250.351
See application file for complete search history.

(56) References Cited

U.S. PATENT DOCUMENTS 6,161,249 A * 12/2000 Hussaini ..................... 15/250.32
2008/0028565 A1 * 2/2008 Thienard ................... 15/250.201

FOREIGN PATENT DOCUMENTS

| FR | 2 830 823 A1 | 4/2003 |
| FR | 2 866 298 A | 8/2005 |
| WO | 2005/102802 A | 11/2005 |

OTHER PUBLICATIONS

International Search Report w/translation from PCT/EP2007/055690 dated Aug. 22, 2007 (4 pages).

* cited by examiner

*Primary Examiner* — Gary Graham
(74) *Attorney, Agent, or Firm* — Osha Liang LLP

(57) ABSTRACT

The present invention relates to a device 1 for attaching a windscreen-wiper blade 100 to an arm 200, comprising a connector 10 intended to be attached to the blade 100, as well as an adaptor 40 intended to be coupled, on the one hand, with the arm 200 and, on the other hand, with the connector 10 in a mobile manner, the adaptor 40 comprising at least one locking element 41, 42 capable of elastically deforming between an active position and a passive position.

The invention is noteworthy in that the connector 10 comprises means for holding each locking element 41, 42 in the active position when the adaptor 40 is in the operating position, and in that for each locking element 41, 42, the connector 10 comprises an undercut enabling the elastic deformation of said locking element 41, 42 when the adaptor 40 is in the assembly position.

18 Claims, 3 Drawing Sheets

DEVICE FOR ATTACHING A WINDSHIELD WIPER BLADE ON AN ARM

The present invention relates to an attachment device for mounting any windscreen-wiper blade on the end of a windscreen-wiper arm.

The invention has a particularly advantageous but not exclusive application in the field of windscreen-wiper systems for motor vehicles.

Unlike the conventional windscreen-wiper blades currently used on most vehicles, a flat blade has the advantage of not having a structure with spreaders. This new category of windscreen-wiper blade still has a flexible wiping strip, but the external framework for supporting it is replaced with a flexible structure that is directly formed integral with said strip.

However, the particular structure of the flat blades has the drawback of being incompatible with the assembly principles which are generally used for coupling standard blades with blade-holding arms, in particular hook-type arms. Indeed, the extreme compactness of a flat blade, as well as the absence of an opening through its structure, do not allow for any considerable relative movements between said blade and the arm on which it is to be equipped, which prevents, in particular, hooking in a substantially perpendicular direction.

For this reason, specific solutions have been developed to enable flat windscreen-wiper blades to be mounted on the ends of arms, in particular hook-type arms. In this respect, it is known to use an attachment device comprising a connector intended to be attached to the blade structure, as well as an adaptor which can be coupled on the one hand with the connector by a mobile link and, on the other hand, with the arm in a direction substantially parallel to the body of the blade.

Locking means are generally provided to guarantee that the arm is locked in position, in particular by its end, on the adaptor and, therefore, perfect coupling between the arm and the flat blade. These generally consist of one or more elastically deformable locking elements which exert their force directly on the end of the arm.

In practice however, it seems important to avoid any risk of disengagement during the operation of the blade in relation to the arm. It is for this reason that the locking means generally also comprise a support element mounted in either a mobile or removable manner, which is capable, once in place, of impeding any undesirable deformation of each locking element. This element is usually in the form of a flap, a cover or a tongue.

Nonetheless, at the end, the flat blade attachment devices contain more parts than their counterparts for conventional windscreen-wiper blades, which entails more complex assembly and usage, as well as a considerable increase in the cost price. It is known that the complexity of an assembly and the presence of a removable element will reduce its reliability.

Thus, the technical problem to be solved by the present invention is to provide an attachment device for mounting a windscreen-wiper blade on the end of a blade-holding arm, for example a hook-type arm, said attachment device comprising a connector designed to be attached to the blade, as well as an adaptor designed to be coupled on the one hand with an arm, in a so-called attachment direction and, on the other hand with the connector in a mobile manner between at least two positions: arm locking, known as the operating position, and arm unlocking, known as the mounting position, respectively, the adaptor comprising at least one locking element which can deform elastically between an active position in which it locks the arm in the attachment position, and a passive position in which it allows the arm to unlock, an attachment device which avoids the problems of the state of the art by being considerably less expensive, while offering substantially improved reliability.

The solution to the technical problem posed involves, according to the present invention, the connector comprising at least one undercut allowing said locking element to deform elastically between its active position and it passive position, when the adaptor is in mounting position.

In a complementary manner, the adaptor is coupled with the connector by a pivoting link so that, when the adaptor is in operating position, it pivots in relation to the connector at a given angle and, when the adaptor is in mounting position, it pivots in relation to a connector at a substantially different angle to that of the operating position.

It is understood that, throughout this text, the notion of position is taken in the broadest sense of the term, which is to say that it does not designate a precise angular value, but rather an angular displacement with limited range centering on a well-defined mean value. The main purpose of this characteristic is to take into account the inevitable oil clearance values which are essential for the correct operation of the attachment device, but also the fact that the angular displacement between the arm and the blade inevitably changes when actually using this assembly.

Additionally, the connector comprises means for holding the locking element in the active position when the adaptor is in locking position.

Nevertheless, the invention as described has the advantage of being capable of locking the interlocking of the arm on the adaptor without requiring any additional parts, even when a flat blade is designed to be coupled with the end of the blade-holding arm.

Locking takes place automatically when the adaptor is tilted into the operating position, while unlocking takes place, evidently, in a similarly automatic fashion as soon as said adaptor pivots in the opposite direction towards the mounting position.

While this simplicity, both structural and functional, is obviously economically advantageous, the fact remains that it also constitutes a true guarantee of reliability.

It should be noted that the entire attachment device is arranged so that the mounting position, also called assembly position, and the operating position are clearly distinct from one another from an angular perspective.

It can also be seen that, in practice, the invention can also apply to any type of windscreen-wiper blade, in particular to conventional straight blades, as well as to the new generation of flat blades. It is furthermore perfectly compatible with different sizes of arms, in particular hook-type arms.

The present invention also relates to the characteristics that appear from the following description, which should be considered in isolation or in any technically feasible combination.

This description, given by way of non-limiting example, aims to provide a clearer understanding of what the invention consists of and how it can be implemented. The description is also made in reference to the appended drawings, wherein.

For reasons of clarity, the same references are used to designate identical elements. Similarly, only the elements which are essential for understanding the invention are shown, without being drawn to scale and in diagrammatic manner.

Figure 1:
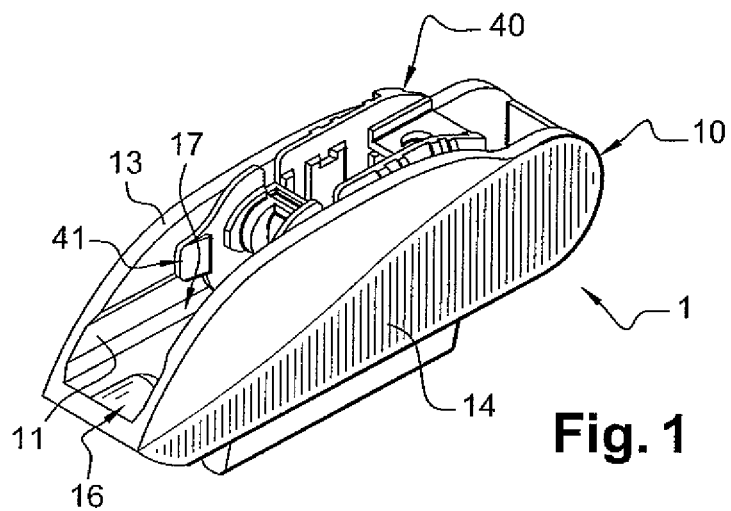
FIG. 1 shows a perspective view of an attachment device according to a first embodiment of the invention; said attachment device being shown in operating position.
Figure 2:
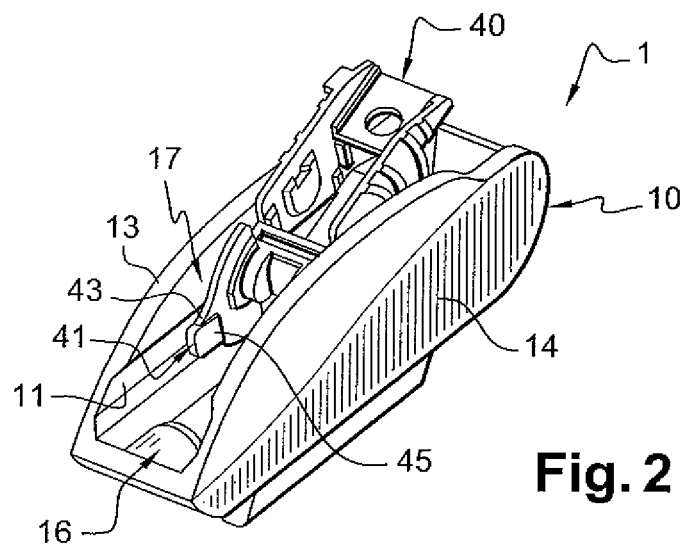
FIG. 2 is a view similar to FIG. 1, with the attachment device in assembly position.
Figure 3:
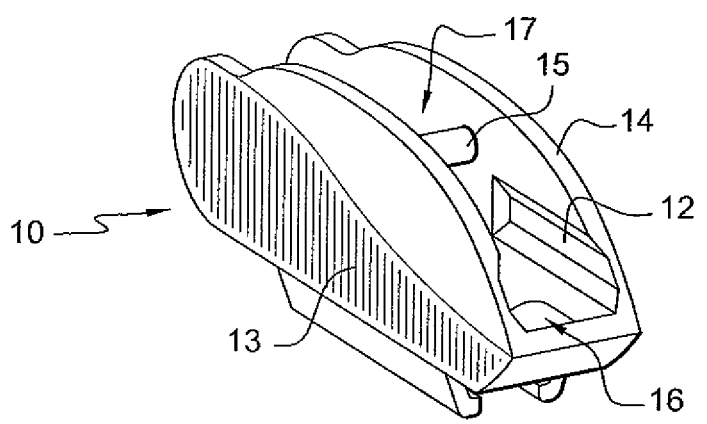
FIG. 3 shows a perspective view of the attachment device connector shown in FIGS. 1 and 2.

FIGS. 1 and 2 show an attachment device 1 which has the function of enabling a flat windscreen-wiper blade 100 to be mounted on the end of a hook-type blade-holding arm 200.

This attachment device 1 essentially consists of two distinct elements which are, however, intended to be joined together permanently to form a functional assembly. It includes, firstly, a connector 10 which is mainly a support piece intended to be attached to the structure of the flat blade 100. The other part of the attachment device 1 consists of an adaptor 40, which is to say a type of interface which can be simultaneously mounted in a pivoting manner on the connector 10 and be interlocked in a so-called attachment position on the inside of the hook-shaped part 210 of the blade-holding arm 200.

According to the aim of the present invention, it should firstly be noted that the adaptor 40 is equipped with two locking elements 41, 42 which can deform elastically between an active position in which they can lock the hook 210 in attached position, and a passive position in which they can extend away from said hook 210.

Also according to the aim of the present invention, it can then be seen that the assembly is arranged so that the body of the connector 10 is capable of holding each locking element 41, 42 in the active position, when the adaptor 40 pivots into the so-called operating position (arm locking position) with a well-defined angle in relation to the connector 10 (FIG. 1).

Also according to the aim of the present invention, it can finally be seen that the body of the connector 10 is equipped with an undercut 11, 12 for each locking element 41, 42, allowing said locking element 41, 42 to deform elastically between its active position and its passive position when the adaptor 40 pivots into the so-called mounting position (arm unlocking position) with an angle in relation to the connector 10 which is substantially distinct from that corresponding to the operating position (FIG. 2).

Figure 5:
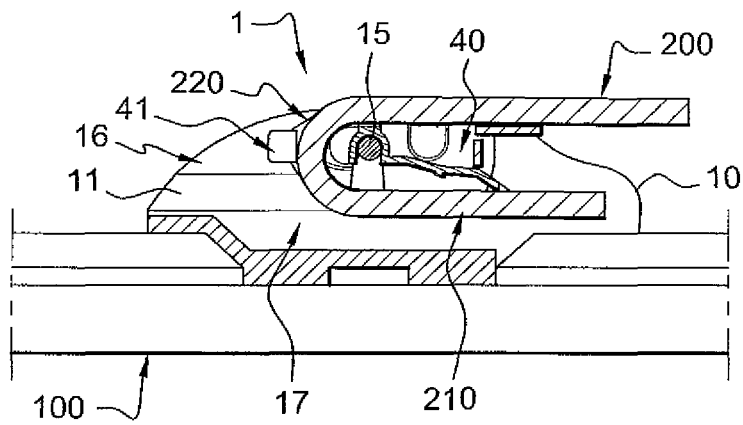
FIG. 5 depicts, in a longitudinal cross-section, a flat windscreen-wiper blade coupled with the end of a hook-type blade-holding arm by means of an attachment device according to FIGS. 1 to 4, shown here in operating position.

As can be seen in FIG. 5, the relative angle between the adaptor 40 and the connector 10 in operating position is substantially zero.

In practice, this specifically means that in such a position, the arm 200 extends substantially parallel to the body of the blade 100 as shown precisely in FIG. 5.

Figure 6:
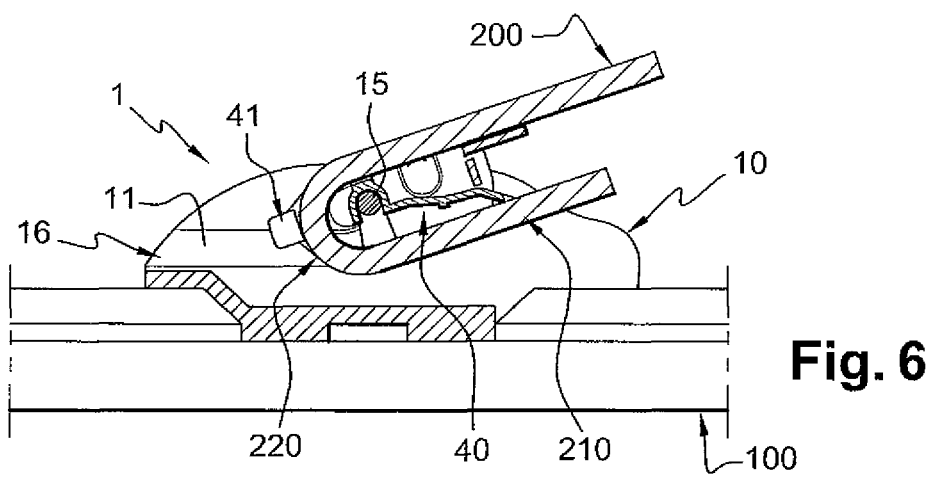
FIG. 6 is a view similar to FIG. 5, with the attachment device in assembly position.
Figure 7:
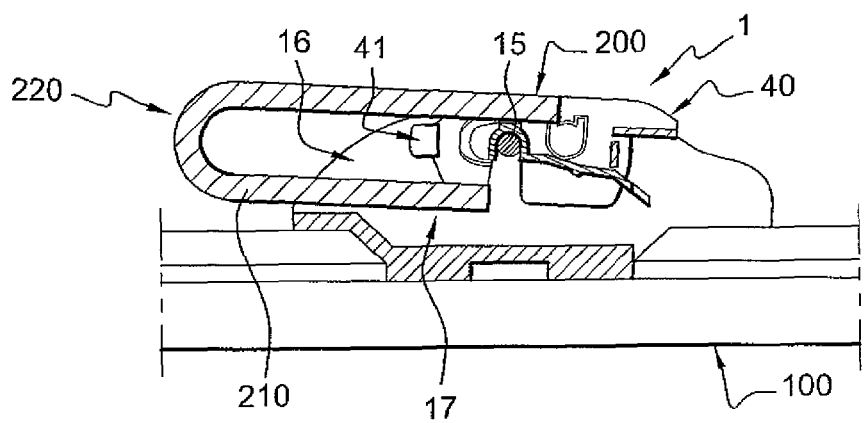
FIG. 7 shows a view similar to that of FIGS. 5 and 6, with the hook arm and the attachment device in pre-assembly position.

According to FIG. 6, the relative angle between the adaptor 40 and the connector 10 in assembly position is substantially greater than the maximum possible value of said relative angle in operating position.

In other words, this means that, in practice and in such a position, the arm 200 extends with an angle in relation to the body of the blade 100 that is substantially greater than the maximum possible relative angle in operating position. However, it can be seen in absolute terms that, according to FIG. 6, the angle of the adaptor 40 in relation to the connector 10 is relatively reduced in the assembly position and, in any case, far from a perpendicular position.

According to a special feature of the invention, each undercut 11, 12 can be chosen from a housing, a recess, a through-hole, a cutaway, or a space freed after elastic deformation of a part of the connector 10 located facing the corresponding locking element 41, 42.

It is important to point out that each undercut 11, 12 can, a priori, have any shape, dimensions and orientation, with the obvious condition that it must be fully capable of performing its function.

According to another special feature of the invention, the connector 10 is equipped with a front opening 16 allowing the hook 210 to engage and disengage with said connector 10, in a direction substantially parallel to the body of the blade 100.

This characteristic proves to be particularly advantageous when the attachment device 1 is formed integral with a flat windscreen-wiper blade 100. As previously explained, it is indeed impossible in this specific case to perform conventional hooking in a substantially perpendicular direction, so that hooking along an axis parallel to the blade 100 constitutes what must be considered an optimal solution.

According to another special feature of the invention, the connector 10 is also equipped with an inner space 17 which firstly allows the hook 210 to move between the attachment position in which it is completely interlocked with the adaptor 40 and a so-called pre-assembly position in which it is only partially interlocked with said adaptor 40 without being locked by each locking element 41, 42. However, this internal space 17 is also arranged so as to allow the assembly made up of the adaptor 40 and the arm 200 coupled together in the pre-assembly position to pivot between the assembly position and the operating position.

In the particular embodiment shown in FIGS. 1 to 7, chosen solely by way of an example, the body of the connector 10 is U-shaped and its lateral sides 13, 14 support a transversal pivoting axis 15 which the adaptor 40 is capable of interlocking with after elastic deformation.

In this context, the internal space 17 is, of course, formed by the space separating the two lateral sides 13, 14 of the connector 10, while the front opening 16 consists of the open end of the 'U' shape. Furthermore, according to FIG. 3 in particular, the two undercuts 11, 12 are in the shape of substantially horizontal grooves arranged respectively facing one another on the inner surfaces of the two lateral sides 13, 14 of the connector 10.

In the example of an embodiment shown in FIGS. 1 to 7, the two locking elements 41, 42 extend naturally in the active position when at rest, which is to say when they are not subjected to any stress. This implies that they must have stress applied to them to enter the passive position.

This characteristic implies that unlocking is not automatic when the adaptor 40 is tilted from the operating position to the assembly position, and that at least one additional operation, which can be a very straightforward manipulation, is required for the locking elements 41, 42 to enter the passive position.

Having said this, according to one alternative embodiment, not shown, at least one locking element 41, 42 can very well extend in the passive position when at rest, meaning that it would require stress to be applied to it in order to enter the active position.

The advantage of such a variation is that locking and unlocking in this case take place entirely automatically, as soon as the adaptor 40 passes from assembly position to operating position respectively, and vice-versa.

Figure 4:
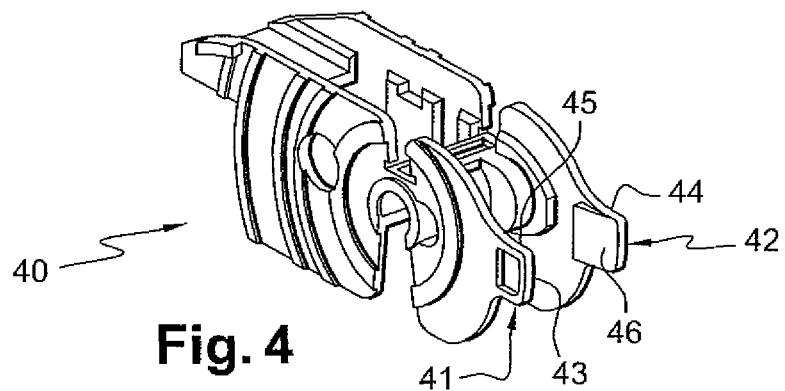
FIG. 4 shows a more detailed view of the adaptor mounted in the attachment device of FIGS. 1 and 2.

As can be clearly seen, in particular in FIG. 4, each locking element 41, 42 used in this embodiment example, consists of a flexible tab 43, 44 which extends substantially parallel to the interlocking direction of the adaptor 40 with the hook 210 of the blade-holding arm 200, and which is equipped on its end with a protruding part 45, 46 forming a stop opposite the distal end 220 of the arm 200.

In a particularly advantageous manner, in active position, the protruding part 45, 46 of each locking element 41, 42 extends directly facing the distal end 220 of the arm 200 when the hook 210 is in attachment position.

According to another advantageous characteristic, in passive position, the protruding part 45, 46 of each locking element 41, 42 extends away from the area actually crossed by the hook 210 during the movement of the latter between the attachment position and the pre-assembly position.

Figure 8:
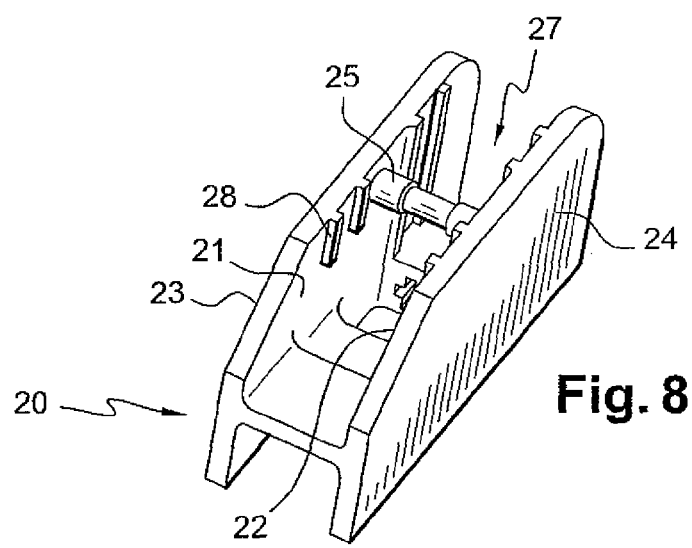
FIG. 8 depicts an attachment device connector according to a second embodiment of the invention.

FIG. 8 shows connector 20 of an attachment device 1 according to a second embodiment of the invention. This is distinguished from the previously described first embodiment essentially by the inner shape of the connector body 20 and, more specifically, by the nature of the undercuts 21, 22 intended for elastic deformation of the locking elements 41, 42 supported by the adaptor 40, not shown.

Indeed, in this case, the lateral sides 23, 24 of the connector 20 are not directly charged with holding each locking element 41, 42 in active position, this being left to a plurality of ribs 28 arranged on the inner surfaces of said sides 23, 24. This therefore means that the undercuts 21, 22 in this case correspond to the areas of the internal space 27 which are directly adjacent to the parts of the inner surfaces in question that do not comprise any ribs 28. The undercuts 21, 22 are more than just simple housings as in the first embodiment, and they must be considered to be more like large recesses. Nevertheless, the second embodiment of the invention shown in FIG. 8 only constitutes a simple technical equivalent to the first, shown in FIGS. 1 to 7.

Figure 9:
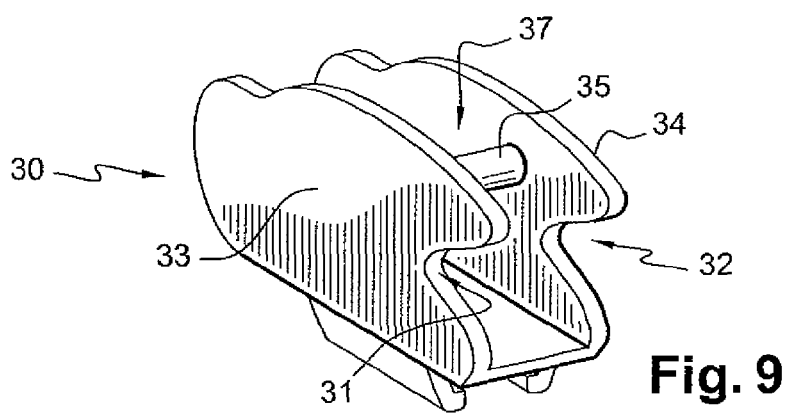
FIG. 9 shows an attachment device connector according to a third embodiment of the invention.

FIG. 9 shows a connector 30 of an attachment device 1 according to a third embodiment of the invention. Its distinguishing feature also lies in the particular nature of the undercuts 31, 32.

The latter are, indeed, in this case, in the form of cutaways arranged through the lateral sides 33, 34 of the connector 30, and which delimit free space portions that allow the elastic deformation of the locking elements 41, 42 supported by the adaptor 40, also not shown.

The present invention has been described in the context of a flat blade intended to be mounted on a blade-holder arm with a so-called hook end, but it is understood that it is not limited to flat blades or to blade-holding arms having this type of end.

Naturally, the invention also relates to any windscreen-wiper blade 100 equipped with an attachment device 1 as previously described.

More generally, the invention also relates to any wiping system equipped with at least one such windscreen-wiper blade 100.

The invention claimed is:

1. An attachment device for mounting a windscreen-wiper blade on a blade-holding arm, said attachment device comprising:
    a connector intended to be attached to the blade; and
    an adaptor intended to be coupled both with the arm in an attachment position and with the connector in a mobile manner in at least two positions:
        an arm locking position, known as an operating position, and
        an arm unlocking position, known as a mounting position, respectively,
    said adaptor comprising at least one locking element capable of elastically deforming between an active position in which the adaptor locks the arm in an attached position, and a passive position in which the adaptor allows the unlocking of the arm,
    wherein the connector comprises at least one undercut enabling the elastic deformation of said locking element between the active position and the passive position, when the adaptor is in the mounting position, and
    wherein said at least one undercut is a recess on an inner surface of a side of the connector, said recess is configured to allow elastic deformation of a longitudinal free end of the locking element in a direction towards the outside of the adaptor, and
    wherein, when at rest, at least one locking element extends in the passive position and requires stress to be applied in order to enter the active position.

2. The attachment device according to claim 1, wherein the adaptor is coupled with the connector by a pivoting link.

3. The attachment device according to claim 1, wherein, in the operating position, a relative angle between the adaptor and the connector is substantially zero.

4. The attachment device according to claim 1, wherein, in the mounting position, a relative angle between the adaptor and the connector is substantially greater than a maximum possible value of said relative angle in operating position.

5. The attachment device according to claim 1, wherein each undercut is one selected from a group consisting of a housing, a recess, a through-hole, a cutaway and a space freed after elastic deformation of a part of the connector located facing the corresponding locking element.

6. The attachment device according to claim 1, wherein the connector comprises means for holding each locking element in the active position, when the adaptor is in locked position.

7. The attachment device according to claim 1, wherein the connector comprises a front opening allowing the arm to engage and disengage in a direction substantially parallel to a body of the blade.

8. The attachment device according to claim 1, wherein the connector comprises an inner space allowing the arm to move between the attachment position in which the arm is intended to be completely interlocked with the adaptor and a pre-assembly position in which the arm is partially interlocked with said adaptor without being locked by each locking element and, wherein the adaptor is coupled with the arm in the pre-assembly position to pivot between the mounting position and the operating position.

9. The attachment device according to claim 8, wherein each locking element comprises a flexible tab which extends substantially parallel to an interlocking direction of the adaptor with the arm, and which is equipped on an end with a protruding part forming a stop opposite a distal end of the arm.

10. The attachment device according to claim 9, wherein, in active position, the protruding part of each locking element extends directly facing the distal end of the arm when in attachment position.

11. The attachment device according to claim 9, wherein, in the passive position, the protruding part of each locking element extends away from an area actually crossed by the arm during the movement of said arm between the attachment position and the pre-assembly position.

12. The attachment device according to claim 1, wherein a body of the connector is U-shaped and its lateral sides support a transversal axis with which the adaptor is capable of interlocking after elastic deformation.

13. The attachment device according to claim 1, wherein when at rest, at least one locking element extends in the active position and requires stress to be applied in order to enter the passive position.

14. A windscreen-wiper blade, wherein the windscreen-wiper blade comprises an attachment device according to claim 1.

15. A wiping system, wherein the wiping system comprises at least one windscreen-wiper blade according to claim 14.

16. An attachment device for mounting a windscreen-wiper blade on a blade-holding arm, said attachment device comprising:

a connector intended to be attached to the blade; and
an adaptor intended to be coupled both with the arm in an attachment position and with the connector in a mobile manner in at least two positions:
an arm locking position, known as an operating position, and
an arm unlocking position, known as a mounting position, respectively,
said adaptor comprising at least one flexible tab capable of elastically deforming between an active position in which the adaptor locks the arm in an attached position, and a passive position in which the adaptor allows the unlocking of the arm,
wherein the connector comprises at least one undercut enabling the elastic deformation of said at least one flexible tab between the active position and the passive position, when the adaptor is in the mounting position, and
wherein said attachment device comprises a plurality of ribs arranged on an inner surface of a lateral side of the connector, at least one of said ribs being configured to restrain the elastic deformation of said flexible tab in the active position.

17. The attachment device for mounting a windscreen-wiper blade on a blade-holding arm according to claim 16, said plurality of ribs being configured to restrain the elastic deformation of said at least one flexible tab in the active position.

18. The attachment device for mounting a windscreen-wiper blade on a blade-holding arm according to claim 16, wherein said at least one flexible tab comprises a protruding part forming a stop for the wiper arm in the active position.

* * * * *